Patented Aug. 12, 1924.

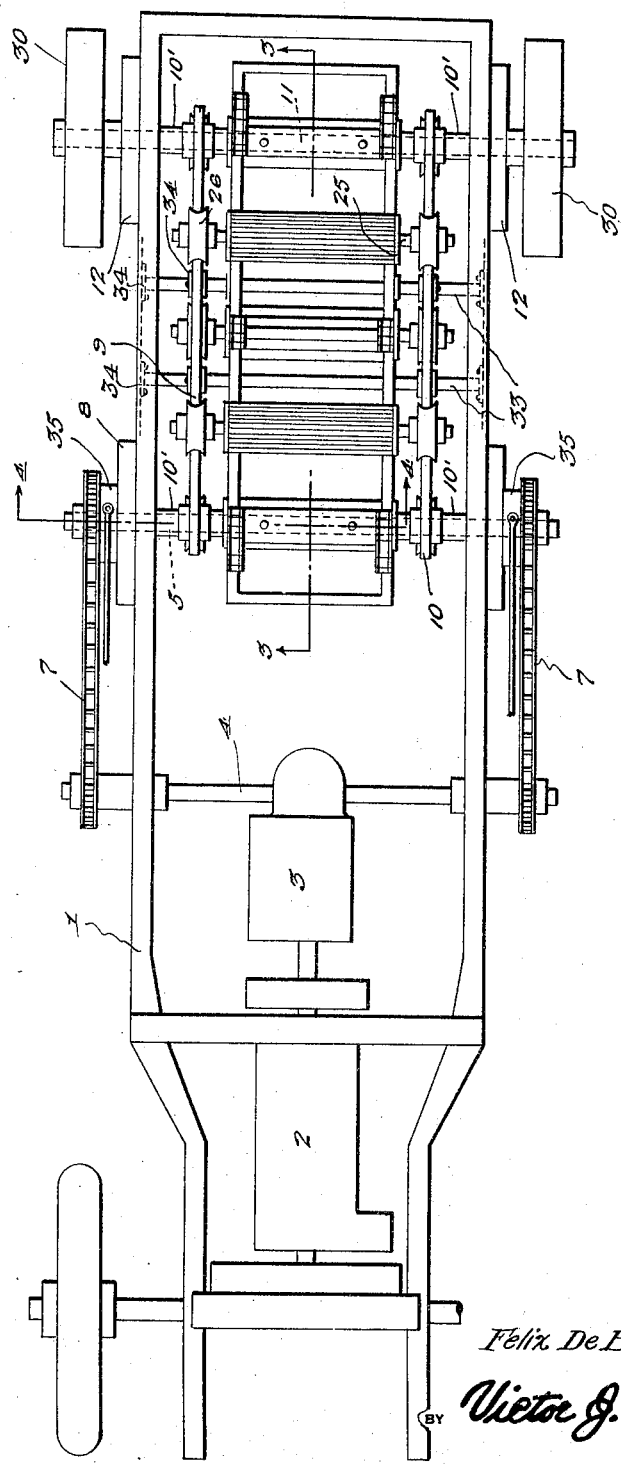

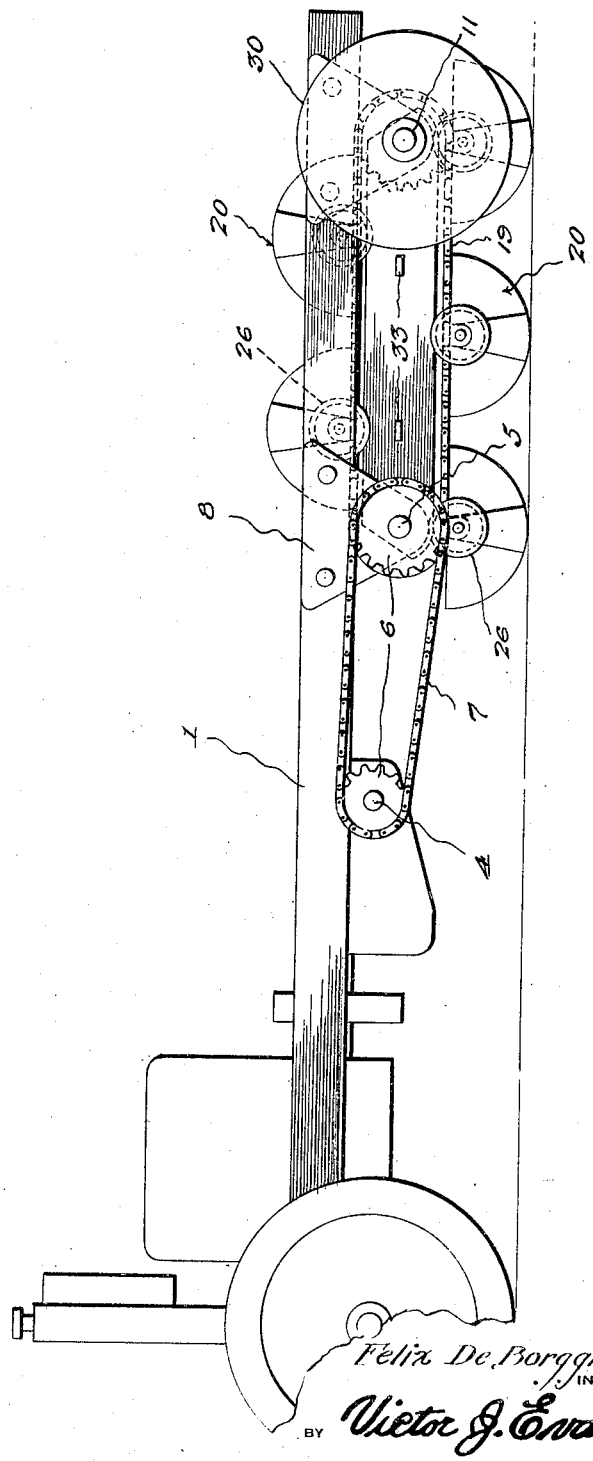

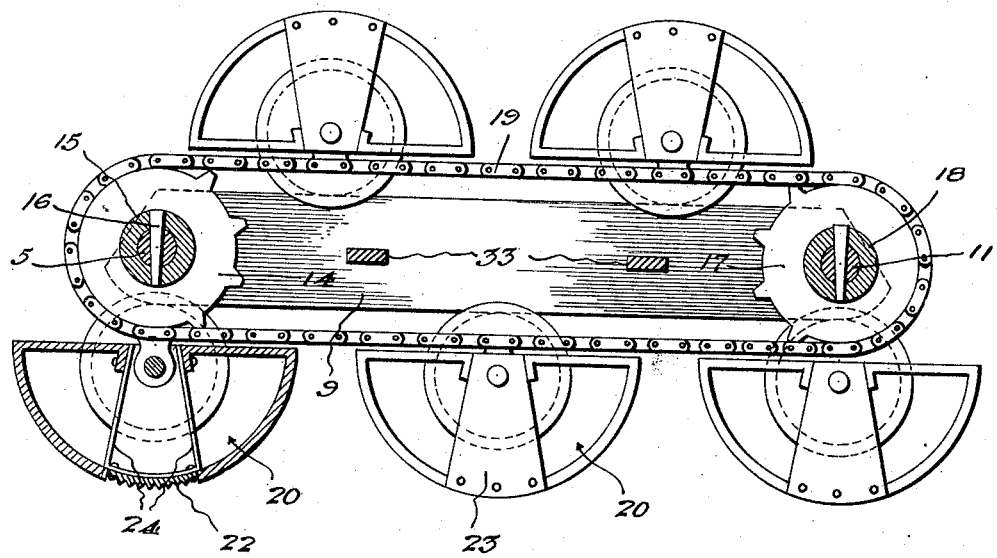
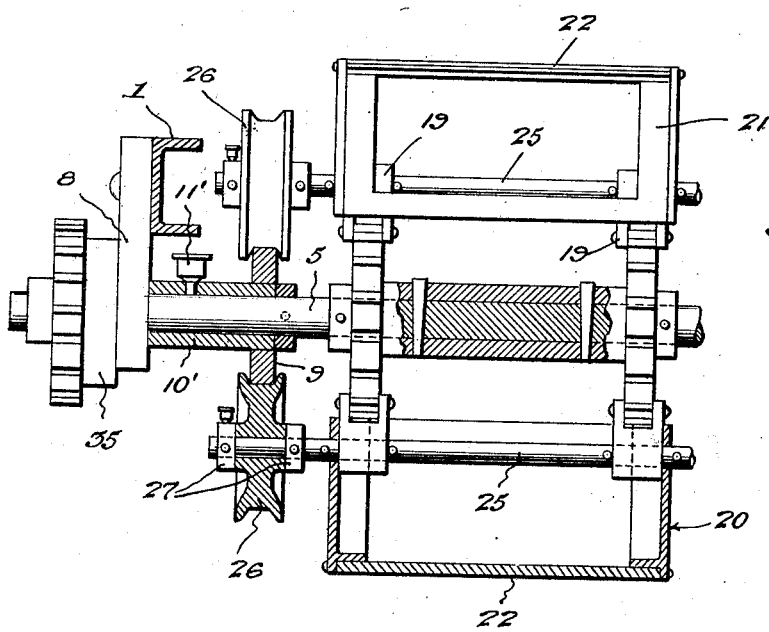

1,505,009

UNITED STATES PATENT OFFICE.

FELIX DE BORGGRAVE, OF CHICAGO, ILLINOIS.

TRUCK.

Application filed May 13, 1921. Serial No. 469,258.

*To all whom it may concern:*

Be it known that I, FELIX DE BORGGRAVE, a citizen of the United States, residing at Chicago, in the county of Cook and State of Illinois, have invented new and useful Improvements in Trucks, of which the following is a specification.

This invention relates to motor vehicles and more particularly to motor vehicles of the track laying type.

An object of this invention is to provide propelling means for motor vehicles in which a novel track laying mechanism is employed embodying relatively long road surface engaging elements thereby practically eliminating the possibility of stalling the vehicle in the mud, sand or on a heavy roadway.

Other objects of the invention will appear in the following detailed description and in the accompanying drawing wherein:

Fig. 1 is a top plan of a truck having the improved propelling mechanism thereon.

Fig. 2 is a side elevation of a truck equipped with the improved propelling mechanism.

Fig. 3 is a longitudinal section through the propelling mechanism taken on the line 3—3 of Fig. 1.

Fig. 4 is a cross section through the improved propelling mechanism taken on the line 4—4 of Fig. 1.

Referring more particularly to the drawing the improved truck embodies the usual form of chassis 1 and it carries a prime mover as indicated at 2 which is connected through the usual type of gearing as indicated at 3 to a shaft 4 which extends transversely of the chassis 1 a short distance rearwardly of the forward end of the truck. The shaft 4 is connected to a driving shaft 5 for rotating the latter by means of sprockets 6 and sprocket chains 7. The shaft 5 extends transversely of the chassis 1 and is supported there beneath by suitable bearing brackets 8 and it extends through the forward ends of rails 9 and 10, one of which is positioned at each side of the longitudinal center of the truck and through the rear ends of which a second shaft 11 extends. The rails 9 and 10 are mounted upon suitable sleeves 10' which are mounted about the rails 9 and 10 respectively. Grease cups or lubricating devices 11' of any suitable structure may be carried by the sleeves 10' for lubricating the bearing surfaces therebetween and the respective shafts. The shaft 11 is parallel with the shaft 5 and is supported beneath the chassis 1 by suitable bearings 12. Spaced sprockets 14 are mounted upon the ends of a hollow shaft 15 which is mounted about and keyed to the shaft 5 as shown at 16 and corresponding sprockets 17 are mounted upon a hollow shaft 18 which is keyed upon the shaft 11. Driving chains 19 pass over the corresponding pairs of sprockets 14 and 17 and they have the road surface engaging elements 20 connected thereto. Each of the road surface engaging elements comprises a semicircular main body 21 having serrated road engaging bars 22 attached thereto at right angles to their flat sides and braced by suitable end braces 23 and radial braces 24. Shafts 25 are carried by the surface engaging elements 20 and project beyond the ends of the surface engaging elements 20 and they have rollers 26 rotatably mounted thereon which engage the edges of the rails 9 and 10 as clearly shown in Fig. 4 of the drawing. The rollers 26, preferably, have concave perimeters so as to prevent lateral movement thereof relative to the rails and they are held against longitudinal movement upon their respective shafts 25 by pinned collars 27. In operation, the sprockets 14 and 17 are driven by the shaft 5 which moves the sprocket chain 19 in an oval path. The surface engaging elements 20 at the lower run of the chain 19 are anchored or remain stationary upon the road surface and the motor vehicle travels forwardly relative thereto and when the vehicle travels forwardly a sufficient distance to position one of the elements 20 which has been in engagement with the road surface at the pickup end of the chain 19 this element is picked up by the chain and immediately prior thereto another element moves into surface engaging position at the opposite end of the path of the chain and thus the elements 20 remain stationary relative to the road surface until they are picked up and moved out of road surface engaging position after which they travel along the upper run of the chain in the same direction as the direction of movement of the vehicle at approximately twice the speed of travel of the truck until they are again moved into road engaging position. The rails 9 and 10 are braced, intermediate their ends, by braces 33 which extend transversely of the chassis 1 and are attached to the rails in any suitable manner such as by means of projections 34 to increase the rigidity and strength of the rails.

Balance wheels 30 may be mounted upon the shaft 11 if desired. Brake wheels or brake structure 35 of any approved construction are carried by the shaft 5 and the operation of the brakes is controlled in the usual manner for braking the operation of the driving mechanism.

It is, of course, to be understood that the invention may be constructed in various other manners and the parts associated in different relations and, therefore, I do not desire to be limited in any manner except as set forth in the claim hereunto appended.

Having thus described my invention what I claim is:

In a motor vehicle, the combination of a chassis, propelling means for the vehicle including road surface engaging elements each comprising a semi-circular body, serrated road engaging plates attached thereto at right angles to their flat sides, an end brace attached to each body, radial braces upon the interior of the body, and means for imparting movement to the propelling means.

In testimony whereof I affix my signature.

FELIX DE BORGGRAVE.